United States Patent [19]

Beccaris

[11] 4,270,645

[45] Jun. 2, 1981

[54] TORSION DAMPING CENTER AND A CLUTCH PLATE ASSEMBLY HAVING SUCH A TORSION DAMPING CENTER

[75] Inventor: Carlo Beccaris, Santena, Italy

[73] Assignee: Societe Anonyme Francaise Du Ferodo, Paris, France

[21] Appl. No.: 956,790

[22] Filed: Nov. 1, 1978

[30] Foreign Application Priority Data

Nov. 8, 1977 [FR] France .................. 77 33540

[51] Int. Cl.³ .............................................. F16D 3/14
[52] U.S. Cl. ........................... 192/106.1; 192/30 V; 192/106.2
[58] Field of Search ............... 192/106.2, 106.1, 30 V, 192/70.17

[56] References Cited

U.S. PATENT DOCUMENTS

| 2,234,443 | 3/1941 | Macbeth | 192/106.1 |
| 2,556,624 | 6/1951 | Macbeth et al. | 192/106.1 X |

FOREIGN PATENT DOCUMENTS 1504222 10/1967 France .

2305637 3/1975 France ...................... 192/106.1

*Primary Examiner*—Philip C. Kannan
*Attorney, Agent, or Firm*—Charles E. Brown

[57] ABSTRACT

A torsion damping center and a clutch plate assembly incorporating the torsion damping center are disclosed. The torsion damping center comprises a first hub which is the actual hub of the clutch plate assembly and which is coaxial to a second hub and mounted for relative angular displacement within predetermined limits, and a damper ring operatively interposed between the hubs for a range of relative angular displacements. The damper ring comprises a pair of identical annular plates of sheet metal construction and a pad of elastic material sandwiched between the plates and bonded thereto. The plates have at least one tooth at their inner periphery for connection for rotation with the first and second hubs respectively. The damper ring constitutes a first damping stage; the second damping stage comprising a series of circumferentially disposed coil springs interposed between the second hub and a friction disc carried on an annular subassembly.

8 Claims, 9 Drawing Figures

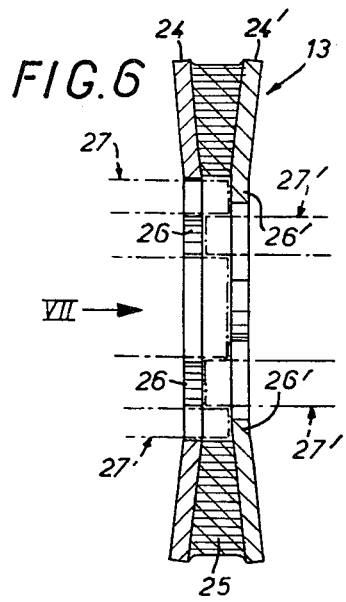
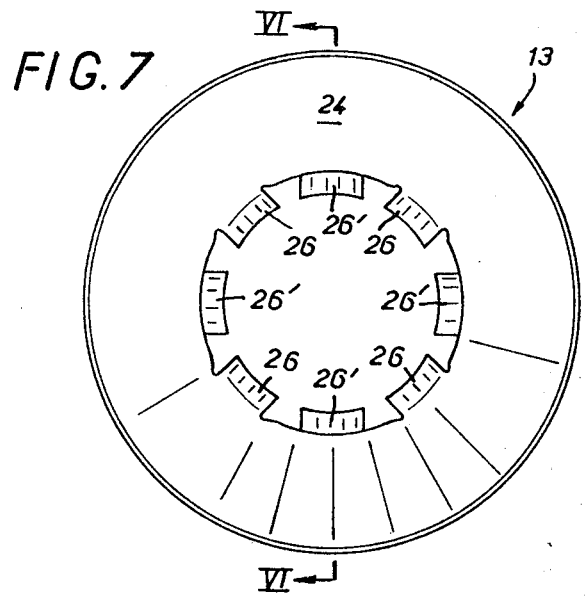
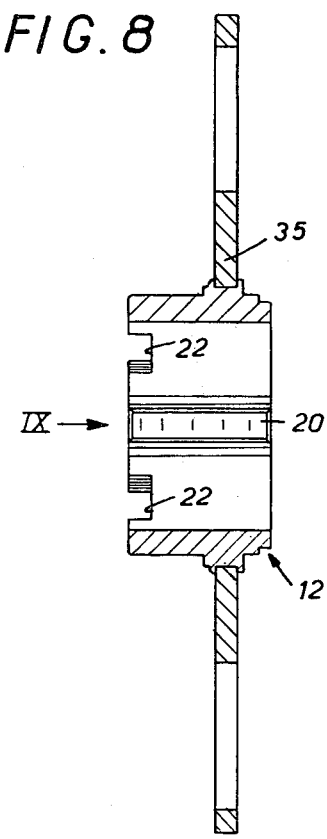
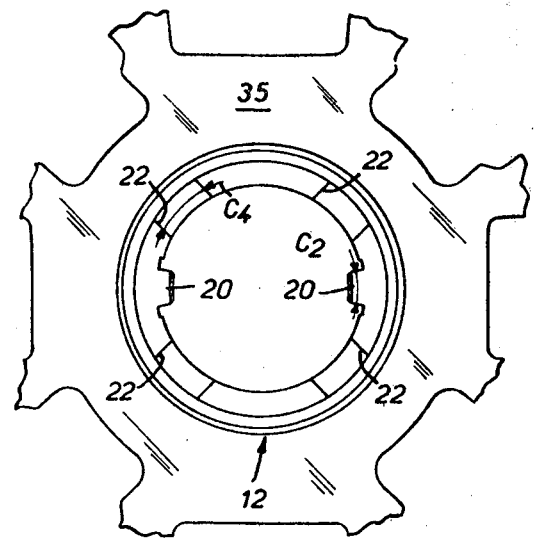

TORSION DAMPING CENTER AND A CLUTCH PLATE ASSEMBLY HAVING SUCH A TORSION DAMPING CENTER

The present invention relates to torsion damping centers for damping vibrations in the course of torque transmission, and more particularly to such torque damping centers for clutch plate assemblies of friction clutches, also known as flexible or spring centers.

Such torsion damping centers comprise a frist hub, a second hub coaxial to the first hub, the first and second hubs being mounted for relative angular displacement within predetermined limits thereby defining circumferential clearance. A damper ring is operatively interposed between the hubs for a range of relative angular displacement within the predetermined limits and comprises two angular plates connected for rotation with the first and second hubs respectively and a damper pad axially interposed between the annular plates and bonded to each of them.

Such an arrangement is described in French Pat. No. 1,504,222, filed on Nov. 29, 1966, in which the torsion damping center is used in the manufacture of motor vehicle clutch plate assemblies, and more particularly, the torsion damping center comprises two serially mounted damping stages between the first hub and an annular subassembly carrying the friction disc.

The first hub of such a torsion damping center comprises the actual hub of the clutch plate assembly, the damper ring comprises the first damping stage and between the second hub and the annular subassembly carrying the friction disc is resilient damping means comprising a second damping stage.

In such a clutch plate assembly the damper ring which thus comprises the first damping stage is adapted to filter frequencies or vibrations over a first part of relative angular displacement between the first hub and the friction disc until the positive engagement of the first hub with the second hub and after positive engagement which in effect overrides the damping ring, the second damping stage associated with the second hub filters vibrations between the first hub and the friction disc for the remainder of relative angular displacement between the first hub and the friction disc.

It is thus possible to differentiate as desired the damping stiffness for the first part of relative angular displacement between the first hub and the friction disc, which corresponds to relatively low torque transmission, and the second part of the relative angular displacement over which the torque transmitted is greater.

For the first part of relative angular displacement, it is accordingly possible to select a smaller damping stiffness which permits customarily dead point noise to be satisfactorily eliminated, such noise inevitably developing in any mechanical transmission between a motor and a wheel axle.

In addition, the first damping stage advantageously extends the potential angular displacement between the hub of the clutch plate assembly and the friction disc.

A general object of the present invention is the provision of a damper ring of simple, economical and reliable construction.

According to the invention there is provided a torsion damping center of the foregoing type in which the annular plates of the damper ring are identical with each other.

According to another aspect of the invention there is provided a clutch plate assembly with a torsion damping center incorporating a damper ring comprising annular plates identical with each other. The clutch plate assembly comprises such a damper ring constituting between the first hub and the annular subassembly carrying the friction disc a first damping stage, a second damping stage being provided between the annular subassembly and the second hub of the damper ring.

The identical construction of the annular plates of the damper ring advantageously reduces manufacturing, inventory and assembly costs.

Preferably each annular plate comprises along its inner periphery for its rotational connection with its associated hub at least one radial tooth, the radial tooth or teeth of one of the annular plates being circumferentially offset with respect to tooth or teeth of the other annular plate.

Such an arrangement has a dual advantage. First of all, in the course of bonding the damper pad to the annular plates which are to axially interconnect the same, it facilitates the positioning of plungers for preventing accidental leaking or flashing or adhesive and elastic material employed, and therefore adapted to avoid or at least minimize subsequent deflashing operation.

Moreover, this allows the maximum axial length of the teeth to be maintained by which the second hub of the damper ring is adapted to interengage with the first hub thereby guaranteeing satisfactory torque transmission between the hubs.

In any event according to a second aspect the torsion damping center according to the present invention is further characterized by the two annular plates of the damper ring having at their inner peripheries at least one radial tooth for connecting them for rotation with their associated hubs.

Features and advantages of the invention will be brought out in the following description, given by way of example, with reference to the accompanying schematic drawings.

FIG. 6 is a longitudinal cross-sectional view, taken on line VI—VI in FIG. 7, of the damper ring of the torsion damping center embodying the invention;

FIG. 7 is an elevational view of the damper ring, taken in the direction of arrow VII in FIG. 6;

FIG. 8 is a longitudinal sectional view of the second hub of the torsion damping center according to the invention; and FIG. 9 is a fragmentary elevational view of the second hub, taken in the direction of arrow IX in FIG. 8.

The drawings illustrate, by way of example, the torsion damping center for use in a motor vehicle clutch plate assembly of a friction clutch.

Figure 2:
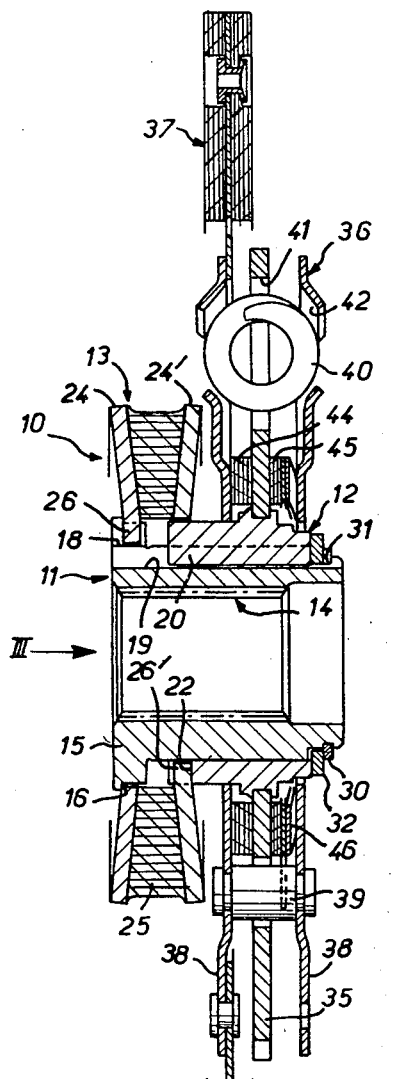
FIG. 2 is a longitudinal sectional view of the friction plate assembly, taken on the broken line II—II in FIG. 1.

The torsion damping center is denoted by general reference numeral 10 in FIG. 2 and essentially comprises a first hub 11, a second hub 12 coaxial to the first hub. The first and second hubs are mounted for relative angular displacement around the common axis within predetermined limits, thereby defining circumferential clearance in the rest position of the torsion damping center. A damper ring 13 is operatively interposed circumferentially between the hubs for a range of relative angular displacement within the predetermined limits.

The internal bore 14 through the first hub 11 is splined for rotation with a shaft, not shown, for example the input shaft to the gear box of a motor vehicle. A radial flange 15 protrudes from one of the ends of the first hub 11. The flange 15 has a transverse shoulder 16 when viewed in longitudinal section, which serves as an abutment against which the damper ring 13 bears. According to the embodiment the abutment is integrally formed with the hub 11 as it is formed in one piece therewith, for example, by machining or by cold forming.

Figure 1:
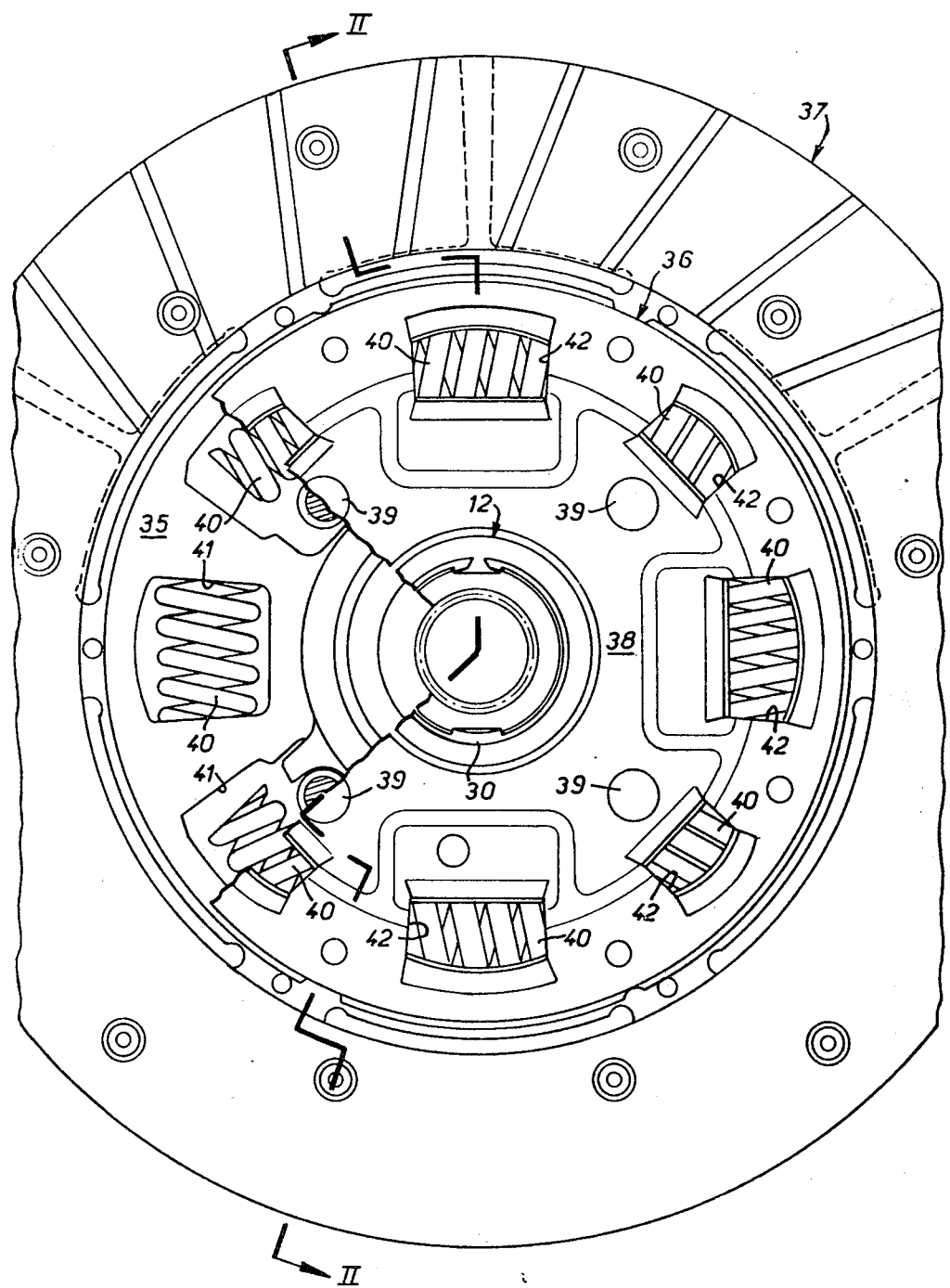
FIG. 1 is a fragmentary elevational secontional view, partially broken away, of a clutch plate assembly having a torsion damping center embodying the invention.
Figure 5:
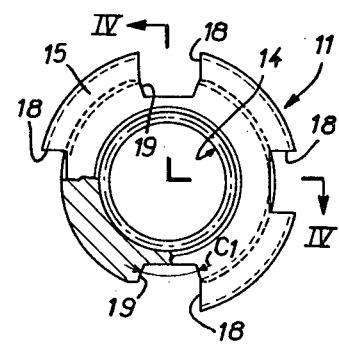
FIG. 5 is a cross-sectional view of the first hub.

The flange 15 of the hub 11 is notched radially and has several indentations or notches 18 which are four in number and in cruciform arrangement as illustrated in FIGS. 1, 2 and 5.

Figure 3:
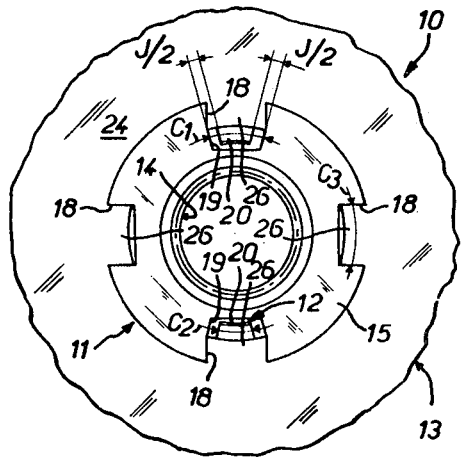
FIG. 3 is another fragmentary sectional view in elevation, taken in the direction of arrow III in FIG. 2.
Figure 4:
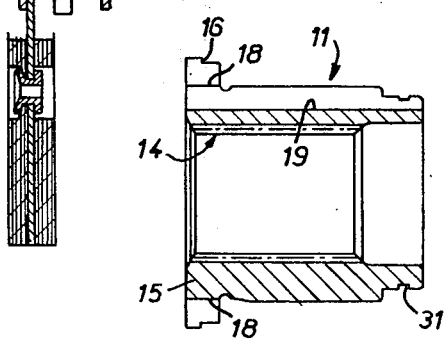
FIG. 4 is a longitudinal sectional view, taken on broken line IV—IV in FIG. 5, of a first hub of the torsion damping center embodying the invention.

The hub 11 has, in addition, on its outer periphery, running along its entire length, two diametrically opposed grooves 19 which form radially inward continuations of two of the indentations 18 through the flange 15. Two ribs 20 run along the entire axial length of the inner bore in the second hub 12 and define teeth cooperable for meshing or engaging with grooves 19 in the first hub 11, each of the ribs 20 being radially received in one of the grooves 19. The circumferential extent C1 of the grooves 19 is greater than the circumferential extent C2 of the ribs 20 thereby defining circumferential clearance or play between the hubs 11 and 12 which interengage. In the position of repose of the hubs, as illustrated in FIG. 3, the clearance to each side of the ribs 20 is equal, i.e., J/2.

Four indentations 22, as illustrated, and in cruciform arrangement are provided on the free edge of hub 12 facing the flange 15. The circumferential extent C4 of indentations 22 is equal to the circumferential extent C3 of indentations 18 on the flange 15 of first hub 11.

In practice the indentations 22 on second hub 12 do not interfere with the ribs 20 on the same; the ribs 20 therefore extend along the entire axial length of the hub 12.

The damper ring 13 comprises two annular plates 24, 24' and an elastic damper pad 25, e.g. of rubber, axially sandwiched or interposed between the annular plates and bonded, e.g. by gluing, to each of them (FIGS. 2, 6 and 7).

According to the invention the annular plates 24, 24' are identical with each other. The plates 24, 24' are struck from sheet metal. In addition, as illustrated, the sheet metal annular plates 24, 24' are stamped to form generally frustoconical peripheral portions flaring away from the axis toward their peripheries. In conjunction with the configuration of the annular plates 24, 24' the pad 25 has a wedgelike or trapezoidal cross section. This arrangement enables all parts of the pad material to be subjected to identical stress irrespective of their radial location and therefore of constant strain. The elastic damper pad may be of continuous annular configuration or circumferentially of uniformly spaced blocks.

Each of the annular plates 24, 24' is provided at its inner periphery with radial teeth 26, 26', four as illustrated, for rotational connection with their respective hubs 11 and 12. The circumferential extent of the teeth 26 on annular plate 24 adapted to be connected for rotation with the first hub 11 is equal to the circumferential extent C3 of the indentations 18 in the first hub. Likewise, the circumferential extent of teeth 26' on annular plate 24' adapted to be connected for rotation with the second hub 12 is equal to the circumferential extent C4 of indentations 22 of the second hub 12 for engagement with one another.

According to an aspect of the invention the teeth 26 of annular plate member 24 are circumferentially staggered or offset with respect to teeth 26' on annular plate 24'. As represented in dash-dotted lines in FIG. 6 it is possible in the course of bonding the pad 25 to the annular plates 24, 24' to introduce plungers or plugs 27, 27' into the annular plates between their radial teeth 26, 26'. The plungers or plugs 27, 27' are arranged in pairs and cover the entire inner periphery of the pad 25 and therefore prevent flashing of the adhesive or glue along the inner periphery.

Furthermore, this arrangement reconciles the direct axial engagement of the various parts for assembly, described below, with the preservation of the maximum possible length of the ribs 20 on the second hub 12.

Indeed, as mentioned above, the indentations 22 on the second hub may henceforth be formed spaced from the ribs 20 in question.

During the assembly of such a torsion damping center 10 the damper ring 13 is inserted axially onto the first hub 11 until the radial teeth 26 on the annular plate 24 enter the indentations 18 on the radial flange 15 of the first hub 11 and the axial abutment of the damper ring against the shoulder 16 on the flange 15. The second hub 12 is then axially received on the first hub 11.

Owing to the relative staggered or offset relationship of the radial teeth 26, 26' of the damper ring 13, indentations 22 of the second hub 12 and the ribs 20 thereof, with a single axial movement the second hub 12 is received on the first hub 11 and the indentations 22 of the second hub 12 are brought into axial engagement with radial teeth 26' on annular plate 24' of the damper ring. Following their engagement the hub 12 is axially clamped by the split resilient ring 30 and the corresponding free end of the second hub 12.

In the illustrated embodiment a key 32 is interposed between the slit ring 30 and the corresponding free end of the second hub 12.

Since we are dealing in the illustrated embodiment with the construction of a friction plate assembly with a spring center for a motor vehicle, hub 12 is provided with a radially projecting web 35 which is associated with an annular assembly 36 carrying a friction disc 37 (FIGS. 1 and 2).

This annular subassembly 36 is comprised of annular plates 38 disposed to either side of the hub web 35 and connected to each other by pins 39 freely received, with clearance, in the hub web.

Between the annular subassembly 36 and the hub 12 and more specifically between the annular subassembly 36 and the hub web 35 carried on the hub 12 is interposed the second damping stage.

In the illustrated embodiment the damping stage comprises a plurality of springs 40 accommodated in part, -and some with clearance- in openings 41 in the hub web 35 and in part in the openings 42 in the annular plates 38. This damping stage further comprises two friction washers 44, 45 which are each disposed respectively to each side of the hub web 35 between the latter and the corresponding annular plate 38, and which are jointly subjected to the force due to an axially acting resilient washer 46 of the ONDUFLEX type. Such arrangements are well known per se and therefore need not be described herein in greater detail.

Likewise, in a manner known per se, the friction disc 37 is adapted to be clamped between a pressure plate and a reaction plate or flywheel fixed for rotation with a first shaft, generally the driving shaft, whereas the hub 11 is adapted to be received on a second shaft, usually the driven shaft.

During the first part of relative angular displacement between the friction disc 37 and the hub 11 which constitutes hub per se of the friction plate assembly concerned, first the damping stage comprised of the damper ring 13 comes into operation, the stiffness of springs 40 being selected so as to ensure a positive driving of the hub web 35 by the friction disc 37.

The damper ring 13 continues to operate until the circumferential clearance or play J/2 is taken up, whereupon the hubs 11 and 12 are in positive engagement or meshing relation, and hub 12 then positively drives the hub 11.

Thereafter only the second damping stage to which the springs 40 belong is operative.

Accordingly the two damping stages are operative in series.

The present invention is of course not intended to be limited to the illustrated and described embodiment but, rather, includes all alternatives, modifications and equivalents falling within the scope of the appended claims. In particular the configuration of the annular plates of the damper ring and/or the number of radial teeth on the annular plates will be matter of design choice.

Finally if the torsion damping center according to the invention is particularly suitable for the first damping stage of a two stage spring-center friction plate assembly, it may obviously be employed independently in other constructions.

What is claimed is:

1. A torsion damping center comprising a first hub, a second hub coaxial to said first hub, said first and second hubs being mounted for relative angular displacement and having means for defining limits of their relative angular displacement, and a damper ring operatively interposed between said hubs for a range of relative angular displacement within the defined limits, said damper ring comprising two annular plates, means for connecting one said annular plate for rotation with said first hub and means for connecting said other annular plate for rotation with said second hub, and elastic damper pad means axially disposed between and bonded to said annular plates, said annular plates being identical with each other.

2. A torsion damping center according to claim 1, wherein said means for connecting said annular plates for rotation with said hubs respectively comprise at least one radial tooth at the inner periphery of each of the annular plates, said at least one tooth on one said annular plate being circumferentially offset relative to said at least one tooth on the other said annular plate.

3. A torsion damping center according to claim 1 or 2, wherein said annular plates are of stamped sheet metal construction.

4. A torsion damping center for a motor vehicle friction clutch, comprising a first hub, a second hub coaxial to said first hub, said first and second hub being mounted for relative angular displacement around their common axis and having means for defining limits of their relative angular displacement, and a damper ring operatively interposed between said hubs over a range of relative angular displacement within the defined limits, said damper ring comprising two identical annular plates, means for connecting on said annular plate for rotation with said first hub and means for connecting the other said annular plate for rotation with said second hub, an elastic damper pad means axially disposed between and bonded to said annular plates, said last-mentioned means comprising at least one radially directed tooth at the inner periphery of each said annular plate.

5. A torsion damping center according to claim 4, wherein said at least one tooth on said one annular plate is circumferentially offset relative to said at least one tooth on said other annular plage.

6. A torsion damping center according to claim 1 or 4, further comprising a transverse shoulder on said first hub defining an axial abutment for said damper ring.

7. A clutch plate assembly for a friction clutch having a torsion damping center, of the type comprising a first hub, an annular subassembly associated with a second hub, said first and second hubs being coaxial and mounted for relative angular displacement around their common axis, said hubs having means defining limits of their relative angular displacement, said annular subassembly carrying at its outer periphery a friction disc, and a damper ring operatively interposed between said hubs over a range of relative angular displacement with the defined limits, said damper ring including two annular plates, means for connecting one said annular plate with said first hub and means for connecting said other annular plate with said second hub, and elastic damper pad means axially interposed between and bonded to said annular plates, wherein said annular plates are of identical configuration.

8. A clutch plate assembly according to claim 7, said damper ring comprises a first damping stage operative over a first part of relative angular displacement between said first hub and said friction disc, and resilient damping means interposed between said second hub and said friction disc comprising a second damping stage operative during a second part of relative angular displacement between said first hub and said friction disc.

* * * * *